Oct. 18, 1927. 1,646,139
A. D'AGUANNO
AUTOMOBILE SAFETY DEVICE
Filed March 30, 1927 2 Sheets-Sheet 1
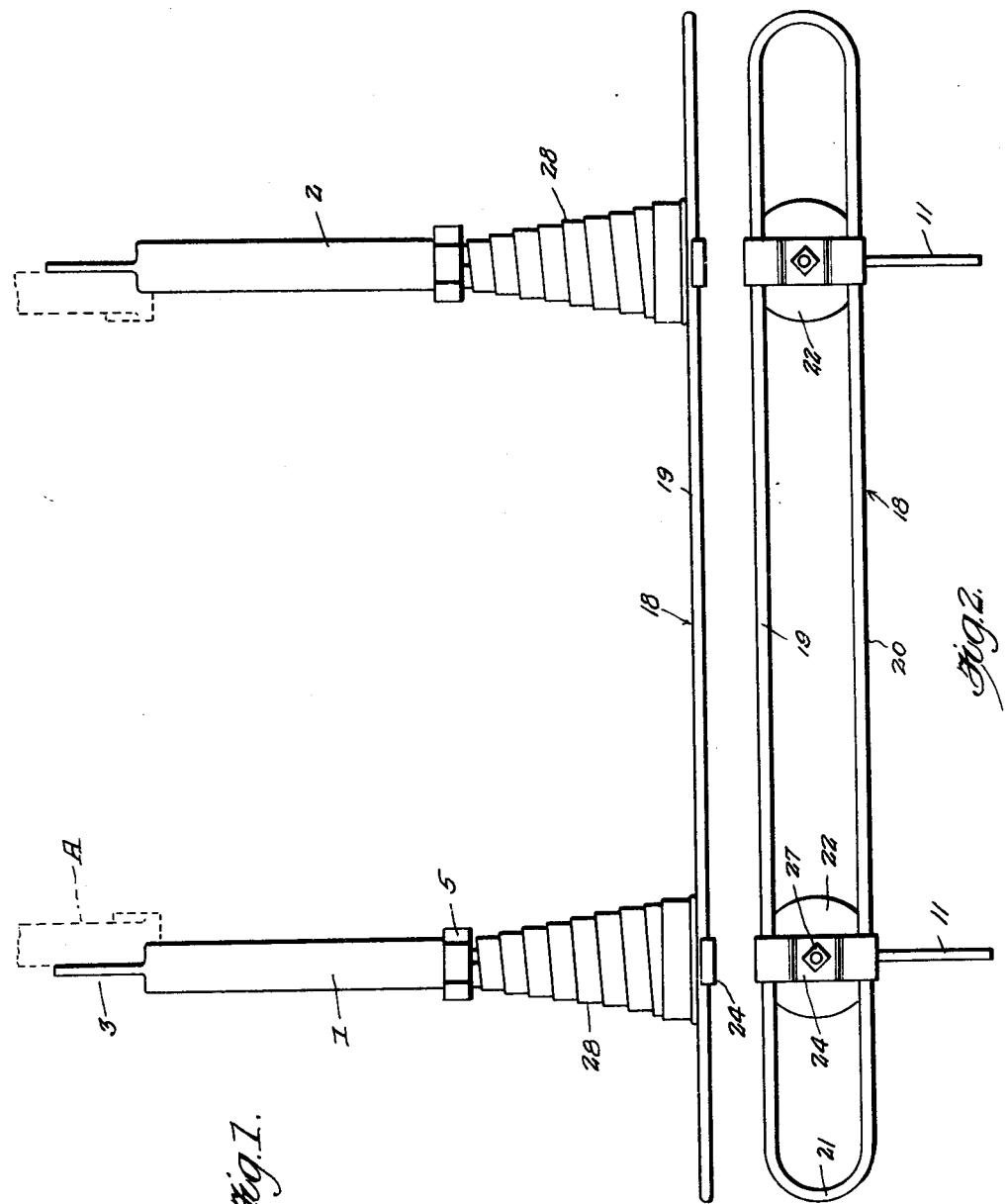
Inventor
Angelo D'Aguanno,
By Clarence A O'Brien
Attorney Oct. 18, 1927.
A. D'AGUANNO
1,646,139
AUTOMOBILE SAFETY DEVICE
Filed March 30, 1927
2 Sheets-Sheet 2
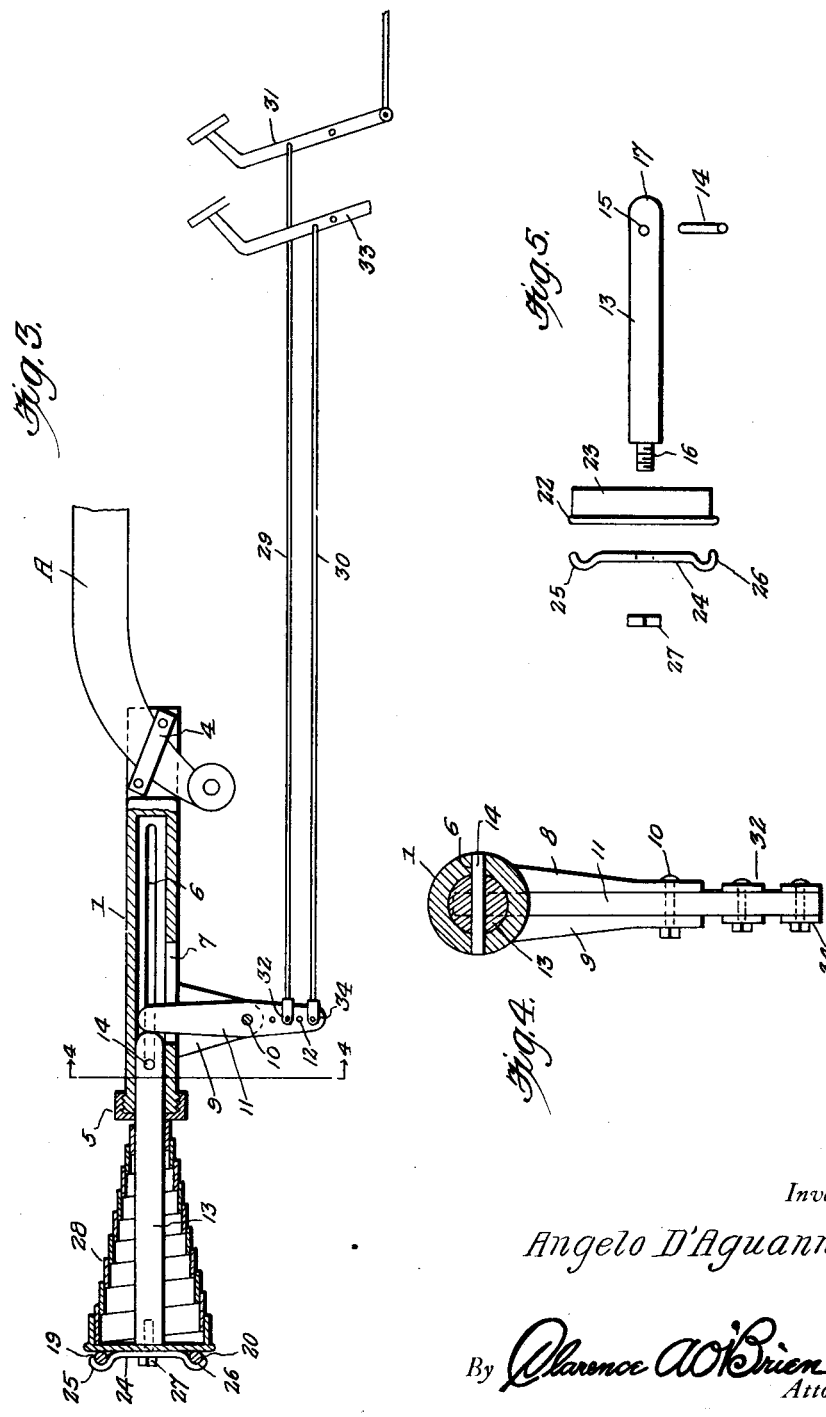
Inventor
Angelo D'Aguanno,
By *Clarence A O'Brien*
Attorney Patented Oct. 18, 1927.

1,646,139

UNITED STATES PATENT OFFICE.

ANGELO D'AGUANNO, OF PROVIDENCE, RHODE ISLAND.

AUTOMOBILE SAFETY DEVICE.

Application filed March 30, 1927. Serial No. 179,521.

The present invention relates to improvements in safety devices for use upon automobiles, and has for its principal object to provide a bumper which is operatively associated with the brake and clutch pedals of the automobile, whereby said brake and clutch will be simultaneously operated when the bumper bar moves rearwardly upon receiving an impact; thus causing the brakes of the automobile to be applied and the clutch thrown into a neutral position whereby the automobile will be brought to a stop.

Another important object of the invention is to provide an automobile safety device, which includes a resilient means for association with the bumper bar for exerting a force tending to retard the rearward movement of the bumper bar, said resilient means further functioning for the purpose of returning the removable elements to their normal positions.

A further object of the invention is to provide an automobile safety device of the above mentioned character, which is of such construction as to permit the same to be readily and easily attached to an automobile without necessitating any material alterations of the parts of the vehicle with which the device is to be associated.

A still further object is to provide an automobile safety device of the above mentioned character, which is simple in construction, strong and durable, and otherwise well adapted for the purpose for which it is designed.

Other objects and advantages of the invention will become apparent during the course of the following detailed description.

In the accompanying drawings:

Figure 1 is a top plan view of the bumper showing the manner in which the same is adapted to be associated with the front of an automobile.

Figure 2 is a front elevation of the bumper bar.

Figure 3 is a longitudinal sectional view through one of the cylinders, showing the manner in which the slidable plunger is associated therewith and on the outer end of which plunger is secured the bumper bar, there being also shown in this figure, the operative connection between the brake and clutch pedals.

Figure 4 is a vertical sectional view, taken approximately on the line 4—4 of Figure 3, looking in the direction of the arrows, and Figure 5 is a disassembled view of the plunger and the several elements adapted to be secured thereon.

In the drawings, wherein for the purpose of illustration is shown the preferred embodiment of my invention, the numerals 1 and 2 designate a pair of elongated horizontally extending cylinders, the forward ends of which are open, the rear ends of these cylinders being flattened to provide attaching flanges 3. These flanges formed at the rear ends of the cylinders are adapted to be secured to the forward ends of the respective sides of the chassis bars of the automobile, by the bracket or clamp 4, in the manner as more clearly illustrated in Figure 3. In this manner, the cylinders may be disposed in parallel spaced relation and will extend forwardly from the chassis bars A. The outer end of each cylinder is externally threaded and detachably threaded thereon is the closure 5. Each cylinder is further provided with a pair of diametrically opposed longitudinally extending slots 6 and these slots are preferably formed in the sides of the cylinder. The purpose of these slots will be hereinafter more fully described.

Each cylinder is further formed with an elongated slot 7, in the bottom thereof and adjacent the forward end of the same as is clearly illustrated in Figure 3. A pair of parallel spaced brackets 8 and 9 respectively depend from the bottom of each cylinder on the opposite sides of the slot 7 and extending transversely through a pair of suitable registering openings formed in the lower ends of these depending brackets is the bolt 10, which provides a pivot for the vertically disposed lever 11. This lever is pivotally supported on the bolt 10 between the brackets 8 and 9 at a point intermediate its ends and the upper end of this lever extends through the slot 7 into the respective cylinder, in a manner as also clearly shown in Figure 3. The lower end of this lever is formed with a series of vertically spaced openings 12 and the purpose thereof will also be presently apparent.

Adapted for slidable movement within each of the cylinders 1 and 2 and extending through a suitable opening provided therefor in the closure 5 is the plunger 13. A transversely extending pin 14 has its intermediate portion disposed within a transverse opening 15 provided therefor adjacent the rear end of the plunger and the ends of this pin 14 are rockable within the diametrically opposed slots 6. The pin 14 prevents the plunger 13 from rotating and furthermore limits the forward sliding movement of the plunger so that the same cannot be disengaged from the cylinder.

The forward end of this plunger has extending therefrom the threaded shank 16 as is more clearly shown in Figure 5. The rear end of the plunger is rounded as indicated at 17, and the purpose of this particular construction will be presently described.

The bumper bar or impact receiving member 18 forming a part of the present safety device, in the present instance comprises a single strand of wire bent to form upper and lower parallel spaced portions 19 and 20 and curved ends 21. Adapted to be disposed on the threaded shank 16 of each plunger is a circular plate or disc 22. The inner face of this disc engages the forward end of the plunger 13, in the manner as clearly shown in Figure 3 and formed on the inner face of this disc is the annular flange 23, the purpose of which will be presently described. Also adapted for disposition on the threaded shank 16 of each of the plungers 13 is the clamp 24, the ends of which are formed with rearwardly curved clips 25 and 26 respectively.

The upper and lower parallel spaced portions 19 and 20 of the bumper bar 18 are disposed between the outer faces of the discs 22 and the respective clamping member 24 and the clips 25 and 26 engage over the upper and lower portions 19 and 20 respectively, in the manner as clearly illustrated in Figure 3. A nut 27 is threaded on the outer threaded end of the threaded shank 16 and engages the outer face of each clamping member for securely holding the parts together whereby the bumper bar will be rigidly attached across the spaced disc.

My improved safety device further includes the provision of a pair of volute springs 28 and these springs are preferably formed of flat spring metal. As is clearly illustrated in Figures 1 and 3, these volute or telescopic springs encircle the respective plungers 13 and the larger end of each spring is disposed within the respective annular flange 23 formed on each of the circular plates or discs 22, while the smaller end of the volute spring engages the closure 5.

These volute springs have a two-fold function. They provide a means for exerting a force tending to retard or resist the rearward movement of the bumper bar 18, thus acting as a shock absorbing means and in addition the springs provide a means for automatically returning the bumper bar and the plunger to their normal positions.

By providing a spring structure of the character shown in the accompanying drawings, it will be readily obvious that when the bumper bar is moved rearwardly, the springs will telescope and will all be received within the largest of the convolutions and as this particular convolution is arranged within the flange 23, the flange will provide a housing for the convolutions of the volute springs when the same are telescoped, thus providing little or no space between the bumper bar and the closures on the forward outer ends of the cylinders when the bumper bar is in the rearwardmost position.

For the purpose of operatively connecting the bumper to the brake control and foot control mechanism of the automobile, whereby the brake and clutch will be simultaneously operated upon the bumper bar receiving an impact, I provide the connecting rods 29 and 30. The rod 29 is connected at its rear end to the foot brake pedal 31 of the automobile upon which the safety device is mounted, while the forward end of the rod is secured to one of the vertically spaced openings 12 formed in the lower end of the vertical lever 11, as at 32. The other rod 30 is secured at its rear end to the clutch pedal 33 and the forward end of this rod is secured to one of the other openings 12 in the lower end of the vertical lever 11, as at 34.

The operation of my improved automobile safety device may be briefly stated as follows:

Normally the parts are arranged as shown in Figures 1 and 3 of the drawings. The volute springs 28 normally urge the bumper bar 18 outwardly and also maintain the plungers in their outermost positions. The upper ends of the levers 11 are in engagement with the rounded rear ends 17 of the plunger and this lever is normally maintained in a perpendicular position.

When the bumper bar strikes a person or otherwise receives an impact, the plunger 13 will move rearwardly within the cylinders 1 and 2 respectively against the tension of the volute springs 28 and during the rearward movement of the plungers the upper ends of the levers will be moved rearwardly causing a forward pull to be exerted on the lower ends of the levers and as a result of this movement of the levers, the brake and clutch pedals 31 and 33 will be simultaneously operated to automatically apply the brakes and move the clutch to a neutral position, thus retarding the forward movement of the vehicle and tending to bring the same to a stop. Either of the levers may be operatively connected to the brake and clutch pedals.

It will thus be seen from the foregoing description that I have provided an automobile safety device, which is of such construction as to permit the same to be readily and easily attached to an automobile without necessitating any material alterations of the parts of the vehicle with which the present invention is associated. Furthermore the present device will, at all times, be positive and efficient in its operation and the brake and clutch will be operated automatically and simultaneously with the rearward movement of the bumper, thus obviating the necessity of the operator of the vehicle having to manually operate the clutch and brake.

While I have shown the preferred embodiment of my invention, it is to be understood that various changes in the size, shape and arrangement of parts may be made without departing from the spirit of the invention or the scope of the adjoined claims.

What I claim is:

1. An automobile safety device comprising a cylinder, attached at its rear end to the front of an automobile, a plunger slidable within the cylinder and extending within the forward end thereof, a bumper bar carried by the forward end of the plunger, a circular plate secured on the forward end of the plunger, an annular flange formed on the inner face of said plate, a volute spring encircling the plunger and disposed between the forward end of the cylinder and said plate, the largest convolution of the volute spring being arranged within the flange on said plate, said flange forming a housing for receiving the convolutions of the spring when the bumper bar and the plunger carrying the same are in their rearwardmost positions.

2. An automobile safety device comprising in combination with the brake and clutch pedals of an automobile, a cylinder mounted on the front of the vehicle and extending forwardly therefrom, a plunger slidable within the cylinder and extending through the forward end thereof, a bumper bar carried by the forward end of the plunger, a vertical lever pivotally supported beneath the cylinder, the upper end of said lever extending into the cylinder for engagement with the inner end of the plunger, means for connecting the brake and clutch pedals to the lower end of the lever, said lever actuated to operate the brake and clutch pedals simultaneously when the plunger moves rearwardly within the cylinder under the bumper rod receiving an impact, and resilient means encircling the plunger and interposed between the bumper bar and the cylinder for absorbing the shock and returning the bar to its normal position.

In testimony whereof I affix my signature.

ANGELO D'AGUANNO.